US008020875B2

(12) United States Patent
Putnam et al.

(10) Patent No.: US 8,020,875 B2
(45) Date of Patent: Sep. 20, 2011

(54) TURBINE FRIENDLY ABRADABLE MATERIAL

(75) Inventors: John W. Putnam, Glastonbury, CT (US); Charles R. Watson, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 329 days.

(21) Appl. No.: 12/238,202

(22) Filed: Sep. 25, 2008

(65) Prior Publication Data

US 2010/0279104 A1 Nov. 4, 2010

Related U.S. Application Data

(63) Continuation-in-part of application No. 11/358,239, filed on Feb. 21, 2006, now abandoned.

(51) Int. Cl.
*C08J 9/32* (2006.01)
*F16J 15/447* (2006.01)

(52) U.S. Cl. ........................................ 277/415; 523/218

(58) Field of Classification Search .................. 277/415; 523/218

See application file for complete search history.

(56) References Cited

U.S. PATENT DOCUMENTS

| | | | | |
|---|---|---|---|---|
| 3,547,455 A | | 12/1970 | Daunt | |
| 3,575,427 A | | 4/1971 | Lapac et al. | |
| 3,873,475 A | | 3/1975 | Pechacek et al. | |
| 3,918,925 A | | 11/1975 | McComas | |
| 4,031,059 A | * | 6/1977 | Strauss | 523/179 |
| 4,257,735 A | | 3/1981 | Bradley et al. | |
| 4,349,313 A | | 9/1982 | Munroe et al. | |
| 4,539,357 A | | 9/1985 | Bobear | |
| 4,582,756 A | | 4/1986 | Niinuma et al. | |
| 4,645,815 A | * | 2/1987 | Lewis | 528/15 |
| 4,666,371 A | | 5/1987 | Alderson | |
| 4,698,115 A | * | 10/1987 | Dodds | 156/382 |
| 5,246,973 A | * | 9/1993 | Nakamura et al. | 521/54 |
| 5,258,212 A | * | 11/1993 | Tomaru et al. | 428/36.8 |
| 5,432,534 A | | 7/1995 | Maruyama et al. | |
| 5,472,315 A | | 12/1995 | Alexander et al. | |
| 5,614,563 A | | 3/1997 | Ishida et al. | |
| 5,702,111 A | | 12/1997 | Smith | |
| 5,731,035 A | | 3/1998 | Suspene | |
| 5,750,581 A | * | 5/1998 | Brennenstuhl et al. | 521/54 |
| 5,948,856 A | | 9/1999 | Juen et al. | |
| 5,981,610 A | | 11/1999 | Meguriya et al. | |
| 6,084,002 A | | 7/2000 | Nicholson et al. | |
| 6,194,476 B1 | | 2/2001 | DeRidder et al. | |
| 6,207,722 B1 | | 3/2001 | Juen et al. | |
| 6,274,648 B1 | | 8/2001 | Meguriya et al. | |
| 6,333,364 B2 | | 12/2001 | Meguriya et al. | |
| 6,334,617 B1 | | 1/2002 | Putnam et al. | |
| 6,352,264 B1 | | 3/2002 | Dalzell, Jr. et al. | |
| 6,486,237 B1 | * | 11/2002 | Howe et al. | 524/71 |
| 6,506,331 B2 | * | 1/2003 | Meguriya | 264/327 |
| 6,552,096 B2 | * | 4/2003 | Meguriya | 521/54 |
| 6,972,313 B2 | * | 12/2005 | Howe et al. | 528/15 |
| 2001/0039159 A1 | | 11/2001 | Janusson et al. | |
| 2003/0198780 A1 | | 10/2003 | Campese et al. | |
| 2004/0041131 A1 | | 3/2004 | Fukushima et al. | |
| 2004/0120739 A1 | | 6/2004 | Chen et al. | |
| 2004/0131846 A1 | | 7/2004 | Epple et al. | |

FOREIGN PATENT DOCUMENTS

| | | |
|---|---|---|
| EP | 1 111 194 A2 | 6/2001 |
| EP | 1111194 | 6/2001 |

OTHER PUBLICATIONS

European Search Report—EP 07 25 0675—dated Mar. 7, 2007—7 pages.
Berthelot: "Composit materials" Jan. 1999, Springer, XP002438290, pp. 21-22.
Berthelot: "Composite Materials", Jan. 1999, Springer, XP002438290, pp. 21-22, paragraph 2.3.2.1.1.
Official Search Report of the European Patent Office for Application No. 07250675.1-1252, filed Feb. 19, 2007.
Product Profile "LSR-5860-Liquid Injection Molding Silcone Elastomer" May 16, 2007 (2 pages).
Product Profile "LSR-5850-Liquid Injection Molding Silcone Elastomer" May 18, 2007 (2 pages).
"Material Safety Data Sheet LSR-5860 Part A" (6 pages), 2007.
"Material Safety Data Sheet LSR-5850 Part B" (6 pages), 2007.
"Material Safety Data Sheet LSR-5850 Part A" (6 pages), 2007.
"Material Safety Data Sheet LSR-5860 Part B" (6 pages), 2007.
M. Butts, et al., "Silicones", from "Encyclopedia of Polymer Science and Technology vol. 11" pp. 765-841, 2003.

* cited by examiner

*Primary Examiner* — Randy Gulakowski
*Assistant Examiner* — Robert Loewe
(74) *Attorney, Agent, or Firm* — Kinney & Lange, P.A.

(57) ABSTRACT

The invention comprises an abradable material containing up to 30 weight percent of fumed silica having a maximum particle from about 5 nanometers to about 20 nanometers and about 1.5 to about 5 weight percent of an abradable organic microballoon filler within an abradable silicone polymer matrix having an elasticity of less than X percent.

19 Claims, No Drawings

TURBINE FRIENDLY ABRADABLE MATERIAL

CROSS-REFERENCE TO RELATED APPLICATION(S)

This application is a continuation-in-part of application Ser. No. 11/358,239, filed on Feb. 21, 2006, entitled "TURBINE FRIENDLY ABRADABLE MATERIAL."

BACKGROUND

The invention is related to resilient organic microballoon filled abradable materials, and in particular to abradable materials for use in the compressor sections of gas turbine engines, particularly in the low compressor section of such engines.

Modern large gas turbine engines have axial flow compressors, which include multiple circular airfoil arrays mounted at the periphery of rotatable disks. Adjacent each set of moving compressor airfoils is an array of stationary airfoils. The efficiency of such a compressor is strongly affected by air, which leaks around the ends of the moving airfoils. The typical approach to minimize such leakage is to provide an abradable air seal with which the outer ends of the compressor airfoil interact to minimize leakage. It is common in the art to find materials which comprise a silicone rubber matrix containing 15 to 50 weight percent of hollow glass microspheres combined with inorganic filler particles as the abradable air seal material.

The evolution of gas turbine engines has been in the direction of higher operating temperatures. Temperatures in the compressor section of the engine have increased moderately, while temperatures in the combustor in the turbine section have increased substantially over the past decades.

In gas turbine engines with glass microsphere containing seals, when the abradable seals abrade, the glass microspheres are carried through the combustor and turbine sections of the engine. In addition, the silicone matrix will often contain other inorganic fillers that can fuse with the rubbed debris and be detrimental to down-stream hardware. These inorganic fillers are commonly used for matrix reinforcement and thermo-oxidative stability. In modern engines, the operating temperatures in the combustor and turbine sections are sufficiently high to cause the glass microspheres to soften or melt. When the silicone rubber is abraded and is passed through the turbine, the silicone is oxidized to form water, carbon dioxide, and silica. The combination of the inorganic fillers, the glass microspheres, and silica may melt and/or fuse together. It has been occasionally observed that these melted or fused materials have adhered to engine components and/or have blocked air cooling holes. Blockage of cooling holes is detrimental to engine component longevity.

One way to correct this problem is described in U.S. Pat. No. 6,334,617, assigned to the assignee of the present invention. The abradable seal material in the U.S. Pat. No. 6,334,617 comprises a resilient matrix material containing hard organic filler particles. The elimination of glass microspheres and the reduction of inorganic filler particles greatly reduced the residue that led to blocked air cooling holes.

Regardless of the polymeric formulation used, large particle size inorganic materials, such as silica aggregates of about 300 nanometers, render the formulation non-abraidable.

SUMMARY

The invention is a high temperature resilient material comprised of a high temperature capable silicone polymeric material, which contains a dispersion of high temperature capable organic microballoons, reduced levels of various residue forming elements, up to 30 weight percent of fumed silica having a maximum particle size no larger than from about 5 nammneters to about 20 nanometers, and less than one weight percent of other inorganic filler material. The organic microballoon particles are selected from a material that is stable to a temperature of at least about 400 degrees Fahrenheit, and are present in the seal in an amount of about 1.5 to about 5 weight percent.

The silicone polymeric matrix is selected so that it is thermally stable at temperatures in excess of 300 degrees Fahrenheit, and preferably in excess of about 450 degrees Fahrenheit and has a strain to failure range of about 125% to 300%, and preferably about 175% to about 200%. Above these limits of elasticity, the polymer will form large particles that clog or block cooling holes and are not within the definition of an abradable material. Most preferably, the silicone polymeric matrix can withstand short temperature spikes of up to about 550 degrees Fahrenheit without undue deterioration.

DETAILED DESCRIPTION

The invention comprises an abradable silicone polymer matrix (ASPM) containing an abradable organic microballoon filler (AOMF) material, reduced levels of various residue forming elements, and less than one weight percent of inorganic filler. The organic microballoon dispersion allows for the use of an ASPM that is as reinforced and thermo-oxidatively stable, at the desired temperatures, as traditional prior art seals made with an ASPM containing inorganic filler material. The organic microballoon dispersion creates a lattice of matrix reinforcing and heat stable elements located within the ASPM.

An ASPM is a material that is a resilient one or two part silicone polymer catalyzed by a precious metal. The precious metal is selected from a group consisting of Ru, Rh, Pd, Os, Ir, Pt, and mixtures thereof. The catalyst can also be a peroxide catalyst, such as dicumyl peroxide which is thermally stable to at least about 300 degrees Fahrenheit.

The cured ASPM material has a room temperature tensile strength of greater than about 300 PSI, an elongation to failure percentage of greater than about 100 percent, and a Shore A Durometer hardness from about 30 to about 85. In one embodiment, the ASPM material is a dimethyl silicone. In other embodiments, the ASPM can be other materials, for example, methyl phenyl silicone. An example of a suitable ASPM is LSR 5860, manufactured by the NuSil Company located in Carpenteria, Calif. This material forms an abradable material having up to 30 weight percent of fumed silica having a particle size of about 5 nanometers to about 20 nanometers. ASPM materials with larger forms of silica do not function as abradable materials. Silica aggregates have a particle size of up to 300 nanometers and are not abradable. The ASPM should have a range of strain to failure of from about 125% to about 300%, with an optimum strain to failure of about 175% to about 200%.

In one embodiment, the ASPM material contains a maximum amount of about one percent of a transition metal oxide selected from a group consisting of oxides of V, Cr, Ce, Mn, Fe, Co, and Ni. In other embodiments, other transition metals or mixtures thereof can be used. The ASPM material may contain up to about one percent of carbon black. In this embodiment, the transition metal oxide and carbon black act as a thermal-oxidative stabilizer. In all embodiments, the total inorganic content other that the fused silica as noted above should not exceed one percent by weight.

In one embodiment, the ASPM material is produced from a mixture of a vinyl terminated polymer having a molecular weight of about 1,000 g/mol to about 1,000,000 g/mol; a silane crosslinker having a molecular weight of about 300 g/mol to about 10,000 g/mol; and a precious metal catalyst, for example Pt. In this embodiment, the ASPM may also contain a reinforcing element such as fumed silica of up to 30 weight percent of fumed silica having a maximum particle size no larger than X microns and preferably below about Y microns.

In one embodiment, the room temperature tensile strength of the cured ASPM exceeds about 300 PSI; has a room temperature elongation to failure exceeding about 200 percent; has a Shore A Durometer hardness of about 40 to about 70; is oxidation resistant, exhibiting less than about 2 percent weight loss after about 100 hours (using a 1"×1"×¼" sample) at about 300 degrees Fahrenheit to about 400 degrees Fahrenheit air exposure; and is thermally stable losing less than about 20 percent of its tensile strength after about 100 hours at about 300 degrees Fahrenheit to about 400 degrees Fahrenheit.

Abradable organic microballoon filler (AOMF) material is a filler with organic microballoon dispersion elements. AOMF is a material that is a hollow organic microballoon that at about 300 degrees Fahrenheit contains less than about 2 percent silicone, is thermally stable, and has an adequate shear strength to reduce the likelihood of particle breakage during manufacturing.

The organic microballoon dispersion elements, which are added to the ASPM, serve to reduce the toughness of the matrix material, and make it more abradable. A proper amount of microballoon material is selected to include in a matrix in order to achieve the desired degree of abradability. In one embodiment, for example, the microballoons compose about 1.5 weight percent to about 5 weight percent of the total matrix (ASPM/AOMF) with a size ranging from about 30 to about 110 micrometers. An example of a suitable AOMF is Phenset BJO-0840, manufactured by Asia Pacific Microspheres located in Selangor, Malaysia.

The organic microballoons are selected from a group consisting essentially of phenolics, epoxies, butadiene, polyamides, polyimides, polyamide-imides, and combinations thereof. In other embodiments, the organic microballoons can be selected from other materials, for example, from other thermoplastic and thermoset materials that are stable in the gas turbine compressor operating environment.

In one embodiment, the AOMF material represents less than about 3 weight percent of the total matrix (ASPM/AOMF), so that the products released through AOMF combustion do not corrode or block gas turbine components; contains less than about 1 weight percent of silicone; and produces only gaseous combustion products when combusted in a gas turbine engine at temperatures in excess of about 750 degrees Fahrenheit, generally in any oxidizing condition.

In the gas turbine compressor embodiment, the abradable seal will generally be located in the radially interior surface of a ring which is located in the engine so that it circumscribes the tips of the moving airfoils. In another embodiment, the abradable seal will be located in a shallow groove or depression in the ring. In this embodiment, the shallow groove or depression has a width in a range of about 35 to about 75 millimeters and a depth of about 1 to about 5 millimeters.

In one embodiment, the ring is metallic, typically aluminum or titanium, and may be formed in segments. The ASPM/AOMF mixture is applied to the shallow groove or depression in the ring or ring segments in a step-by-step process. First, the ring is cleaned using conventional techniques. Second, the cleaned groove surface of the ring is anodized. In other embodiments, for example when overhauling used parts, the cleaned groove surface will have a chromate conversion coating applied to the groove surface. In still other embodiments, no anodizing or chromate conversion coating is applied. Third, in order to improve the adherence of the polymer matrix, a primer (for example SP270 from the NuSil Corporation located in Carpenteria, Calif.) is applied to the surface of the ring. Fourth, the ring or ring segment is provided with a mandrel which conforms to the inner surface of the ring, sealing the groove and leaving an annular cavity. The mandrel has at least one aperture through which the ASPM/AOMF mixture is injected. The mixture then travels to and subsequently fills the annular cavity. In other embodiments a mandrel is not used but instead, open-mold pouring is used to create the ring or ring segment. Fifth, after the cavity is filled, the aperture through which the mixture has been injected (or poured into), and any other remaining open apertures, are closed, and the filled ring or ring segment (along with the mandrel) is placed in an oven for curing. Curing is typically performed at temperatures ranging from about 300 degrees Fahrenheit to about 400 degrees Fahrenheit for about one to about four hours. Sixth, the ring and mandrel are removed from the oven, the mandrel is separated from the ring, and the ring or ring segment with the groove containing the ASPM/AOMF is cured. In other embodiments, the ASPM/AOMF may be further heat cured.

Accordingly, the present invention provides the following benefits: it describes an abradable material for use in modern high temperature gas turbine engines, specifically in the combustor section; which contains organic microballoon filler particles; contains less than one weight percent of inorganic filler material and yet still is matrix reinforcing and thermo-oxidatively stable; whose constituents will not subsequently adhere to or block combustor and turbine components; which exhibits higher erosion resistance over temperatures ranging from room temperature to about 400 degrees Fahrenheit; is usable in temperatures of up to about 550 degrees Fahrenheit; and exhibits desirable abradability characteristics.

The present invention is more particularly described in the following example which is intended to be an illustration only, since numerous modifications and variations within the scope of the present invention will be apparent to those skilled in the art. Unless otherwise noted, all parts, percentages, and ratios reported in the following example are on a weight basis, and all materials used were obtained, or are available, from the supplier described, or may be synthesized by conventional techniques.

Example 1

An abradable silicone polymer matrix commercially available under the trade designation "LSR 5850" produced by the NuSil Corporation located in Carpenteria, Calif., was thermally modified with cerium oxide and carbon black. The polymer matrix had about 30 weight percent of fumed silica having a particle size of between 5 nanometers and 20 nanometers. No other inorganics were present in an amount of 1 percent by weight. The modified abradable silicone polymer matrix was then combined with 2.5 weight percent of phenolic microballoons having an average size of 70 micrometers. The organic phenolic microballoons are commercially available under the trade designation "Phenset BJO-0840" and are manufactured by Asia Pacific Microspheres located in Selangor, Malaysia. The filled polymer matrix was then processed and cured for two hours initial cure at 300 degrees Fahrenheit and a post cure for two hours at 300 degrees Fahrenheit. The cured material had a strain to failure of about 175% to 200&.

Abradable seals fabricated from the resulting product provided equivalent abradability, reduced engine cooling hole blockage, and about 1.5 to about 2 times the erosion life of current abradable seal materials which contain one weight percent or more of inorganic filler material other than fumed silica with a particle size between 5 nanometers and 20 nanometers when tested at room temperature and 400 degrees Fahrenheit, respectively, in a laboratory erosion apparatus using 50-70 mesh Ottawa sand at 800 feet per second and a 20 degree incidence angle.

The present invention is an improvement on U.S. Pat. No. 6,334,617 because it even further reduces the residue that can lead to blocked air cooling holes. The present invention removes even more material that could leave a residue upon exposure to high heat. The silicone polymer matrix itself can contain iron oxide, carbon black, and alumina, all of which can leave a residue upon exposure to high heat. Using a silicone polymer matrix that has a reduced, or at least a minimum, level of these and other materials greatly reduces residue levels. Further, the use of abradable organic microballoon filler particles allows the overall seal material to still be as reinforcing and thermo-oxidatively stable as prior art seals containing one percent or more of inorganic filler and/or higher levels of other residue producing materials.

Accordingly, the present invention is an abradable material for use in modern high temperature gas turbine engines, specifically in the combustor section; which contains less than one weight percent of inorganic filler material other than the above mentioned small particle size fumed and yet still is matrix reinforcing and thermo-oxidatively stable; that contains organic microballoon filler particles; whose constituents will not subsequently adhere to or block combustor and turbine components; which exhibits higher erosion resistance over temperatures ranging from room temperature to about 400 degrees Fahrenheit; is usable in temperatures of up to about 550 degrees Fahrenheit; and exhibits desirable abradability characteristics.

Although the present invention has been described with reference to preferred embodiments, workers skilled in the art will recognize that changes may be made in form and detail without departing from the spirit and scope of the invention.

The invention claimed is:

1. An abradable material comprising an abradable silicone polymer matrix containing from about 1.5 to about 5 weight percent of an abradable organic microballoon filler that is thermally stable at about 400° F. (204.4° C.) for 100 hours and about 30 weight percent of fumed silica having a maximum particle size from about 5 nanometers to about 20 nanometers, the abradable material having a strain to failure of between 125% and 300%.

2. The abradable material of claim 1, wherein the abradable organic microballoon filler particles have a size in a range of about 30 to about 110 micrometers.

3. The abradable material of claim 1, wherein the abradable organic microballoon filler contains less than about 1 weight percent silicone.

4. The abradable material of claim 1, wherein the abradable organic microballoon filler is selected from the group consisting of phenolics, epoxies, butadiene, polyamides, polyimides, polyamide-imides, and mixtures thereof.

5. The abradable material of claim 1, wherein the abradable organic microballoon filler produces only gaseous combustion products when combusted in a gas turbine engine.

6. The abradable material of claim 1, wherein the abradable silicone polymer matrix comprises a dimethyl silicone, a methyl phenyl silicone, or combinations thereof.

7. The abradable material of claim 1, wherein the abradable silicone polymer matrix contains a stabilizing material consisting of at least one transition metal oxide.

8. The abradable material of claim 1, wherein the abradable silicone polymer matrix is catalyzed by Pt.

9. The abradable material of claim 1, wherein the abradable silicone polymer matrix is catalyzed by a peroxide.

10. The abradable material of claim 1, wherein a heat cured abradable silicone polymer matrix has a room temperature tensile strength exceeding at least 300 pounds per square inch (PSI).

11. The abradable material of claim 1, wherein the abradable silicone polymer matrix has a room temperature Shore A Durometer hardness of about 30 to about 85.

12. A gas turbine engine abradable material containing about 30 weight percent fumed silica having a maximum particle size from about 5 nanometers to about 20 nanometers, and less than one weight percent of any other inorganic filler, the abradable material comprising about 1.5 to about 5 weight percent of an abradable organic microballoon filler that is thermally stable at about 400° F. (204.4° C.) for 100 hours within an abradable silicone polymer matrix and has a strain to failure of between 125% and 300%.

13. The abradable material of claim 12, wherein the abradable organic microballoon filler particles have a size in a range of about 30 to about 110 micrometers.

14. The abradable material of claim 12, wherein the abradable organic microballoon filler contains less than about 1 weight percent silicone.

15. The abradable material of claim 12, wherein the abradable organic microballoon filler is selected from the group consisting of phenolics, epoxies, butadiene, polyamides, polyimides, polyamide-imides, and mixtures thereof.

16. The abradable material of claim 12, wherein the abradable organic microballoon filler produces only gaseous combustion products when combusted in the gas turbine engine.

17. The abradable material of claim 12, wherein the abradable silicone polymer matrix comprises a dimethyl silicone, a methyl phenyl silicone, or combinations thereof.

18. A method of producing an abradable material, the method comprising:

adding an abradable organic microballoon filler that is thermally stable at about 400° F. (204.4° C.) for 100 hours to an abradable silicone polymer matrix having about 30 weight percent of fumed silica having a maximum particle size from about 5 nanometers to about 20 nanometers, thereby creating an abradable mixture; and curing the abradable mixture, whereby the matrix has a strain to failure of between 125% and 300%.

19. The method of claim 18, wherein the abradable organic microballoon filler comprises from about 1.5 to about 5 weight percent of the total abradable mixture.

* * * * *